Patented Sept. 26, 1939

2,174,242

UNITED STATES PATENT OFFICE 2,174,242

AMINOGLYCOLS

Henry B. Hass, West Lafayette, and Byron M. Vanderbilt, Terre Haute, Ind., assignors to Purdue Research Foundation, La Fayette, Ind., a corporation of Indiana No Drawing. Application August 13, 1937,
Serial No. 158,959

4 Claims. (Cl. 260—584)

Our invention relates to new and useful aliphatic aminoglycols and, more particularly, to aminoglycols wherein the carbon atom attached to the amino group is adjacent to two carbon atoms attached to the hydroxyl groups.

The aminoglycols of our invention have been found to be of particular value for use as agents for absorbing acids such as hydrogen sulfide and carbon dioxide from industrial gases. These compounds are organic bases containing free amino and hydroxyl groups and other various uses for them will readily occur to persons skilled in the art.

Specifically, the aminoglycols of our invention have the following general structural formula:

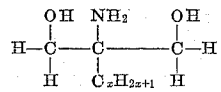

wherein $x$ represents two or three. The aminoglycols included in this general structural formula are: 2-amino-2-ethyl-1,3-propanediol, 2-amino-2-propyl-1,3-propanediol, and 2-amino-2-isopropyl-1,3-propanediol.

These aminoglycols may be suitably prepared by any of the known methods of reducing a nitro to an amino group provided that the conditions are not sufficiently drastic to cause splitting of the molecule. We prefer, however, to prepare these compounds by the catalytic hydrogenation of the corresponding nitro compounds in accordance with the process of copending application Serial No. 159,869 filed August 19, 1937. According to this process the nitroglycol is hydrogenated at atmospheric or increased pressures in the presence of a nickel catalyst in the liquid phase with or without an auxiliary solvent at temperatures under 125° C. In general, any hydrogenation catalyst may be used that is active within the temperatures employed. We prefer, however, to use a powdered nickel catalyst that is prepared in the following manner: A nickel-aluminum alloy is prepared in the powdered form, a suitable alloy containing 50% aluminum and 50% nickel. The aluminum is dissolved out of the powdered alloy by strong alkali solution, and the nickel residue is washed free from alkali and salts with water and kept under liquid. This catalyst is active at temperatures around 25° C. and may be used repeatedly without losing its activity. The hydrogenation may be carried out at hydrogen pressures varying from atmospheric pressure to over 2,000 pounds per square inch. The rate of reaction is directly proportional to the hydrogen pressures and the temperatures employed. Thus, at a hydrogen pressure of 600 pounds per square inch and at temperatures from 60 to 70° C. under the conditions we have employed, the hydrogenation will, in general, be found to be complete after a period of 15 to 45 minutes. Lower pressures and lower temperatures will in general require longer times for the hydrogenation reaction to be completed and, conversely, higher pressures and temperatures will in general shorten the time for completion of the hydrogenation reaction. Optimum pressures and temperatures may be readily determined by simple experimentation and will depend, to some extent, on the amount of catalyst and solvent employed, the surface of the reaction mixture exposed to the hydrogen, the rate of agitation, and the tendency for the nitroalcohol to decompose at higher temperatures under the conditions employed. Methyl or ethyl alcohol may be employed as solvents.

After the reaction has been effected the catalyst may be separated from the reaction mixture by any suitable means such as filtration or decantation, the volatile materials present removed by distillation and the aminoglycol recovered from the residue by crystallization from suitable solvents. The aminoglycol may be further purified by refractionation at reduced pressures, by fractional crystallization of certain of its salts such as the oxalates or hydrochlorides, or by fractional crystallization of the pure compounds from suitable solvents.

The following examples illustrate suitable procedures for the preparation of the aminoglycols of this group:

Example I

One hundred and nine parts by weight of 2-nitro-2-isopropyl-1,3-propanediol were mixed with 252 parts of methyl alcohol, 35 parts of water, and 7½ parts of a nickel catalyst, prepared as described in the foregoing, and the mixture was introduced into a suitable hydrogenation apparatus and sealed. Hydrogen was then introduced into the apparatus at room temperature at a pressure of 400 pounds per square inch. The hydrogen was introduced at such a rate that the temperature of the apparatus was not allowed to rise above 45° C., and the hydrogenation was continued for 3 hours with constant agitation. At the conclusion of the hydrogenation the reaction mixture was removed from the hydrogenation apparatus and the catalyst separated from the solution by filtration. The volatile materials were removed from the filtrate by distillation and 2-amino-2-isopropyl-1,3-propanediol was recovered from the residue by crystallization from benzene.

*Example II*

One hundred parts by weight of 2-nitro-2-ethyl-1,3-propanediol, 216 parts of methanol, 30 parts of water, and 7½ parts of nickel catalyst were introduced into a suitable hydrogenation apparatus and sealed. Hydrogen was introduced into the apparatus at room temperature at 200 pounds per square inch pressure. The temperature of the reaction was not allowed to go above 40° C. during the initial stages. After the reaction ceased giving out any considerable amount of heat the hydrogen pressure was increased to 1,000 pounds per square inch, and the apparatus was heated to 50° C. by external means for one hour with constant agitation. At the end of this period the material was removed from the apparatus and the catalyst separated from the solution by filtration. The solution was subjected to fractional distillation at 7 mm. of mercury pressure and 2-amino-2-ethyl-1,3-propanediol was distilled over between 145 to 150° C.

The aminoglycols of this group are white, crystalline solids at room temperature. They are all extremely stable at temperatures up to at least 200° C. and are soluble in the ordinary oxygenated organic solvents such as ethyl alcohol, ethyl acetate, and acetone. 2-amino-2-ethyl-1,3-propanediol has a melting point between 37½° C. and 38½° C, 2-amino-2-propyl-1,3-propanediol melts at 58° C., and 2-amino-2-isopropyl-1,3-propanediol melts at 74° C. Since the number of preparations of each of the compounds examined was limited, it should be understood that while the properties given will be useful in identifying the compounds of our invention, we do not wish to limit ourselves to products having the exact properties listed.

Solutions of the aminoglycols of our invention are particularly useful as agents for absorbing acids such as hydrogen sulfide and carbon dioxide from industrial gases. The hydrogen sulfide and carbon dioxide may be subsequently liberated from these aminoglycols by simple heating and the aminoglycol reused. The aminoglycols of our invention are also useful as intermediates for the preparation of numerous organic compounds. Various other uses of these materials will be apparent to those skilled in the art.

The nitroglycols used in preparing the aminoglycols described above may be produced by any suitable means, as for example by the methods disclosed by J. Pauwels (Rec. Trav. Chim. 17, 27–49, 1898), and A. Shaw (Rec. Trav. Chim. 17, 50–65, 1898). According to these methods, a nitroparaffin and formaldehyde may be reacted in equimolecular proportion in the presence of alkaline catalysts, to produce a nitroalcohol, which in turn may be reacted with an equimolecular proportion of formaldehyde to form the nitroglycol; or a nitroparaffin may be directly reacted with 2 moles of formaldehyde to form the nitroglycol.

Our invention now having been described, what we claim is:

1. An aminoglycol of the formula:

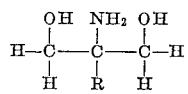

wherein R is a member of the group consisting of $C_2H_5$ and $C_3H_7$.

2. 2-amino-2-ethyl-1,3-propanediol.
3. 2-amino-2-n-propyl-1,3-propanediol.
4. 2-amino-2-isopropyl-1,3-propanediol.

HENRY B. HASS.
BYRON M. VANDERBILT.